3,272,812
PREPARATION OF 1,3,5-TRIMETHYLHEXA-HYDRO-s-TRIAZINE
James S. Dix and Marvin M. Johnson, Bartlesville, Okla., assignors to Phillips Petroleum Company, a corporation of Delaware
No Drawing. Filed Sept. 27, 1963, Ser. No. 312,013
6 Claims. (Cl. 260—248)

This invention relates to the preparation of 1,3,5-trimethylhexahydro-s-triazine. In one of its aspects, the invention relates to the preparation of 1,3,5-trimethylhexahydro-s-triazine by oxidation under conditions of rapid contacting and quick quenching of a feed stock containing essentially trimethylamine. In another of its aspects, the invention relates to the preparation of 1,3,5-trimethylhexahydro-s-triazine by oxidizing trimethylamine in an oxidative dehydrogenation type of apparatus, for example, as described in U.S. Patent 3,049,574, of M. M. Johnson, issued August 14, 1962. In a further aspect, the invention relates to the oxidation of trimethylamine employing an oxidant such as air in which there may be present some water vapor.

We have now found that trimethylamine can be oxidized to 1,3,5-trimethylhexahydro-s-triazine and that this can be done, for example, by preheating trimethylamine and a stream consisting of oxygen and water and bringing together these streams into impinging jet contact in a reaction zone fitted with heaters for a short-time contact, following which quench water is used to shock chill the mixture.

It is an object of this invention to provide a process for the preparation of 1,3,5-trimethylhexahydro-s-triazine. It is another object of this invention to provide a process for the conversion of trimethylamine to 1,3,5-trimethylhexahydro-s-triazine. It is a further object of this invention to provide a method for the rapid oxidation of trimethylamine to obtain 1,3,5-trimethylhexahydro-s-triazine and associated reaction products.

Other aspects, objects, and the several advantages of the invention are apparent from a study of this disclosure and the appended claims.

According to the present invention, there is provided a process for the conversion of trimethylamine to 1,3,5-trimethylhexahydro-s-triazine by oxidizing the trimethylamine employing an oxidant such as air or oxygen, the process comprising bringing the reactants together rapidly into intimate contact and then quenching a reaction mass thus obtained, the reaction being effected at a temperature generally ranging from about 600 to about 900° C. Preferably, the trimethylamine and/or the oxidant are preheated to a temperature generally in the neighborhood of about above 400° C. prior to bringing the reactants into contact, each with the other. The reaction time will be very short indeed, and will generally be of the order of less than 25 milliseconds.

One manner of operation to obtain the short reaction times of the invention is by use of an oxidative dehydrogenation apparatus such as described in the above-mentioned U.S. patent of M. M. Johnson Briefly, the apparatus comprises means for rapidly contacting an oxidant and oxidizable material under turbulent conditions, rapidly injecting a quenching medium into the reaction zone, and immediately discharging the mixture through a converging-diverging nozzle, such as a DeLaval nozzle, to obtain shock cooling to stabilize the reaction mixture, thus preventing further reaction The reaction effluent can be treated in any suitable manner, and in one form of the invention passes to a suitable separation means, such as a cyclone separator, to obtain separation of gaseous and liquid products, etc.

The oxidants which can be employed according to the invention include oxygen or oxygen-containing mixtures such as air or mixtures of oxygen with water vapor. The amine/oxygen mol ratio can vary over a wide range. Generally, this ratio will fall within the range of from about 2 to 1 to about 6 to 1 and can be even higher.

Respecting the very short reaction time, a factor of this invention, it will be recognized by one skilled in the art that the exact time during which reaction is caused or permitted to proceed will vary for optimum results, depending upon the variables involved. The time of about less than 25 milliseconds is now preferred. Generally, the time will be in the range of from about 1 to about 100 milliseconds. Higher reaction times are presently not preferred.

The operation of the process of the invention can be continuous, although batch operation is within the scope of the broad form of the invention. Unreacted trimethylamine can be recycled to the oxidation or reaction zone.

It is known that the 1,3,5-trimethylhexahydro-s-triazine has been employed as a stabilizer for chlorinated solvents. The present invention provides a desirable alternate preparation for the 1,3,5-trimethylhexahydro-s-triazine which has been prepared by the reaction of aldehydes, such as formaldehyde or paraformaldehyde, with methylamine.

The following example illustrates the invention.

EXAMPLE

A run was carried out in which trimethylamine was oxidized to 1,3,5-trimethylhexahydro-s-triazine according to the process of this invention.

In this run, two streams, one consisting of oxygen and water, and the other of trimethylamine, were separately preheated and fed into impinging jets leading to a cylindrical reaction chamber. The reaction zone, fitted with heaters, led into a converging-diverging nozzle outlet. Just upstream of the nozzle, quench water was introduced into the reaction mixture, and the resulting mixture passed through the nozzle wherein shock cooling was obtained. A further description of the device is provided in U.S. Patent 3,049,574.

The quenched effluent led to a liquid cyclone separator. Non-condensibles plus some entrained liquid passed overhead through a collector, while the liquid from the bottom of the cyclone was collected and treated with sufficient KOH to cause separation of an organic layer. Distillation of this organic layer yielded a cut whose refractive index and infrared spectrum were in agreement with 1,3,5-trimethylhexahydro-s-triazine. The results of this run are tabulated below in the table.

Table

| | |
|---|---|
| Amine/oxygen mol ratio | 4.0/1 |
| Water/amine mol ratio | 1.6/1 |
| Amine preheat temp., ° C. | 427 |
| Oxidant preheat temp., ° C. | 591 |
| Reaction temp., ° C. | 625 |
| Reaction pressure, p.s.i.g. | 139 |
| Residence time, milliseconds | 14 |
| Per pass yield of 1,3,5-trimethylhexahydro-s-triazine,, mol percent (based on trimethylamine charge) | 20 |

1,3,5-trimethylhexahydro-s-triazine can be pyrolyzed to N-methyl-methylenimine, as described in U.S. Patents 2,729,679 and 2,729,680.

Reasonable variation and modification are possible within the scope of the foregoing disclosure and the appended claims to the invention, the essence of which is that it has been found that trimethylamine can be oxidized at an elevated temperature and very short times of reaction, followed by rapid quenching to form 1,3,5-trimethylhexahydro-s-triazine.

We claim:
1. A process for the preparation of 1,3,5-trimethylhexahydro-s-triazine which comprises bringing trimethylamine and an oxidizing reactant yielding oxygen together at elevated temperature for a short reaction time of the order of a number of milliseconds and then quenching the reaction mass thus obtained.

2. A process for the preparation of 1,3,5-trimethylhexahydro-s-triazine which comprises oxidizing trimethylamine with an oxidizing agent having the oxidizing characteristics of oxygen or oxygen-containing mixtures such as air and mixtures of oxygen with water vapor during a reaction time of the order of about 1 to about 100 milliseconds and then rapidly cooling the reaction mass thus obtained.

3. A method for the conversion of a substantial proportion of a trimethylamine containing feed stock into 1,3,5-trimethylhexahydro-s-triazine which comprises preheating said feed stock and an oxidant and bringing the said stock and oxidant together under turbulent conditions in a reaction zone, said oxidant in said zone furnishing oxygen, rapidly injecting a quenching medium into the reaction mass thus obtained to obtain shock cooling and then recovering 1,3,5-trimethylhexahydro-s-triazine from the reaction mass, the temperature in the reaction zone being in the range of from about 600 to about 900° C. and the reaction time being of the order of less than about 25 milliseconds.

4. A method for the preparation of 1,3,5-trimethylhexahydro-s-triazine by oxidation under conditions of rapid contacting and quick quenching of trimethylamine which comprises rapidly contacting an oxidant and trimethylamine under turbulent conditions in a reaction zone, said oxidant in said zone furnishing oxygen, rapidly injecting a quenching medium into the reaction zone and immediately discharging the mixture from the reaction zone through a converging-diverging nozzle to obtain shock cooling to stabilize the mixture and recovering 1,3,5-trimethylhexahydro-s-triazine from the reaction mass thus obtained.

5. The oxidation of trimethylamine by bringing trimethylamine and oxygen together into turbulent contact in a reaction zone in the presence of water vapor, the amine/oxygen mol ratio being at least about 2 to 1, the temperature being in the range of from about 600 to about about 900° C. and the time of contact being in the range of from about 1 to about 100 milliseconds and then rapidly quenching the reaction mass thus obtained forming a reaction mass containing 1,3,5-trimethylhexahydro-s-triazine.

6. A method for the production of 1,3,5-trimethylhexahydro-s-triazine by oxidation of trimethylamine which comprises preheating a stream of trimethylamine and a stream consisting essentially of oxygen and water and feeding the said streams into impinging jet contact leading to a reaction chamber, causing reaction to occur at a temperature in the range of from about 600 to about 900° C. for a short time of the order of generally less than about 25 milliseconds and then quenching the reaction mass thus obtained and obtaining the desired 1,3,5-trimethylhexahydro-s-triazine from said mixture.

References Cited by the Examiner
UNITED STATES PATENTS 3,049,574  8/1962  Johnson _____ 260—666

WALTER A. MODANCE, *Primary Examiner.*

JOHN M. FORD, *Assistant Examiner.*